US012732363B2

(12) United States Patent
Stapleton

(10) Patent No.: US 12,732,363 B2
(45) Date of Patent: Sep. 8, 2026

(54) SECURE NODE EXCHANGE ATTRIBUTE-BASED KEYS (SNEAK)

(71) Applicant: Wells Fargo Bank, N.A., San Francisco, CA (US)

(72) Inventor: Jeffrey J. Stapleton, O'Fallon, MO (US)

(73) Assignee: Wells Fargo Bank, N.A., San Francisco, CA (US)

(*) Notice: Subject to any disclaimer, the term of this patent is extended or adjusted under 35 U.S.C. 154(b) by 246 days.

(21) Appl. No.: 18/642,251

(22) Filed: Apr. 22, 2024

(65) Prior Publication Data

US 2025/0330314 A1 Oct. 23, 2025

(51) Int. Cl.
*H04L 9/32* (2006.01)
*H04L 9/14* (2006.01)

(52) U.S. Cl.
CPC .................................... *H04L 9/14* (2013.01)

(58) Field of Classification Search
CPC ....... H04L 9/30; H04L 9/0861; H04L 9/0819; H04L 9/14; H04L 9/3247
USPC .......................................................... 713/171
See application file for complete search history.

(56) References Cited

U.S. PATENT DOCUMENTS

2019/0319784 A1* 10/2019 Datye ........................ H04L 9/14
2020/0084027 A1* 3/2020 Duchon ................ G06F 21/602
2021/0243173 A1* 8/2021 D'Alessandro ..... H04L 63/0464

* cited by examiner

*Primary Examiner* — Jeffrey C Pwu
*Assistant Examiner* — Samuel Ambaye
(74) *Attorney, Agent, or Firm* — Foley & Lardner LLP

(57) ABSTRACT

The arrangements disclosed herein relate to systems, apparatus, methods, and non-transitory computer readable media for Secure Node Exchange Attribute-based Keys (SNEAK) including secure exchange of sensitive message elements between sequential message nodes using attribute-based key management. Each message node can access none, one, some, or all encrypted message elements based on assigned attributes of that message node. A key management node provides key exchange for each Content Encryption Key (CEK) used to protect the message elements based on attributes of the message nodes.

19 Claims, 3 Drawing Sheets

| Messages | Element $m_1$ | Element $m_2$ | Element $m_3$ |
| --- | --- | --- | --- |
| M | $X_p$[$CEK_1$], $CEK_1$($m_1$) | $X_p$[$CEK_2$], $CEK_2$($m_2$) | $X_p$[$CEK_3$], $CEK_3$($m_3$) |
| $M^1$ | $B_p$[$CEK_1$], $CEK_1$($m_1$) | $X_p$[$CEK_2$], $CEK_2$($m_2$) | $X_p$[$CEK_3$], $CEK_3$($m_3$) |
| $M^2$ | $C_p$[$CEK_1$], $CEK_1$($m_1$) | $X_p$[$CEK_2$], $CEK_2$($m_2$) | $C_p$[$CEK_3$], $CEK_3$($m_3$) |
| $M^3$ | $D_p$[$CEK_1$], $CEK_1$($m_1$) | $D_p$[$CEK_2$], $CEK_2$($m_2$) | $X_p$[$CEK_3$], $CEK_3$($m_3$) |

SECURE NODE EXCHANGE ATTRIBUTE-BASED KEYS (SNEAK)

BACKGROUND

Different message elements have different accessibility rules depending on the message domain and the participants' attributes. Today, each message domain can be a virtual private network operating autonomously with varying assurance levels and different cryptography and key management methods. While compartmentalization of these systems aids overall security, the cryptography and key management methods have varying assurance levels that need to be elevated to a high assurance level.

SUMMARY

The arrangements disclosed herein relate to systems, methods, non-transitory computer-readable media, and apparatuses for receiving, by a key management node from one of a first node or a second node, a first message comprising a plurality of encrypted message components and a plurality of established Content Encryption Keys (CEKs), wherein each of the plurality of encrypted message components of the first message is one of a plurality of message components encrypted using a respective one of a plurality of CEKs, and wherein each of the plurality of established CEKs is one of the plurality of CEKs established using a public key of the key management node; determining, by the key management node, a first established CEK of the plurality of established CEKs using a private key of the key management node to obtain a first CEK, wherein the private key and the public key of the key management node form a public and private key pair, a first encrypted message component of the plurality of encrypted message components is a first message component of the plurality of message components encrypted using the first CEK; establishing, by the key management node, the first CEK using a public key of the second node to obtain a second established CEK; and sending, by the key management node, a second message comprising the plurality of encrypted message components, the second established CEK, and a third established CEK, wherein the third established CEK is one of the plurality of established CEKs in the first message, and wherein the second node determines the second established CEK to obtain the first CEK and decrypts the first encrypted message component using the first CEK to obtain the first message component.

These and other features, together with the organization and manner of operation thereof, will become apparent from the following detailed description when taken in conjunction with the accompanying drawings.

DETAILED DESCRIPTION

Figure 1A:
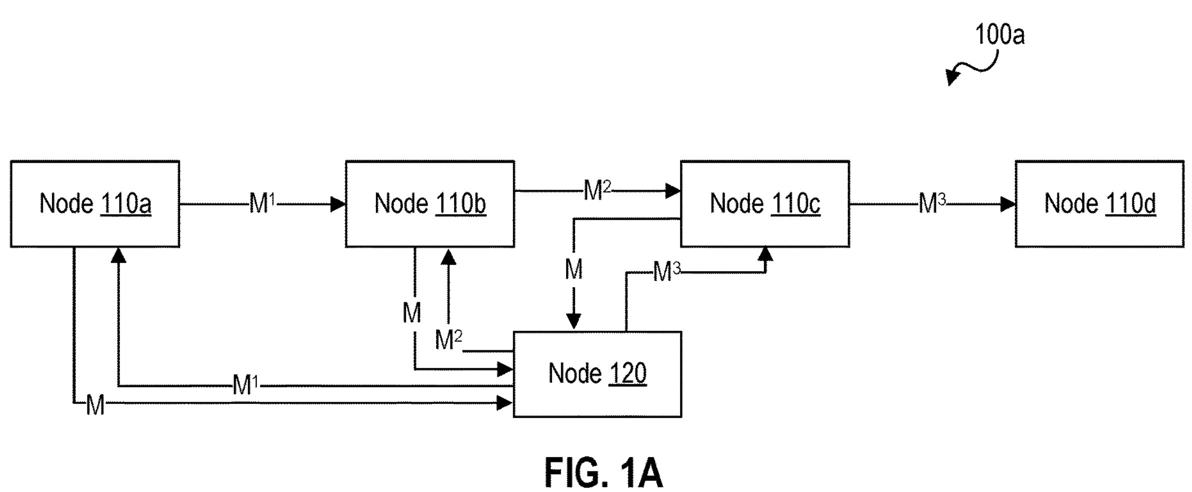
FIG. 1A is a diagram illustrating an example method for exchanging message elements via a key management node, according to various arrangements.

A Personal Identification Number (PIN) can be used in a transaction consummated using payment card. The payment card industry rules for PIN include aspects such as encryption, translation, and verification. PIN-based authentication in a transaction involving a payment card typically involves an issuer, cardholder, merchant, acquirer, and payment network. The issuer is the cardholder's financial institution, providing a payment card and establishing the PIN with the cardholder. The issuer also receives authorization request from a payment network for PIN verification. The cardholder uses the payment card at a merchant location or an online merchant page/site and enters the PIN into a user interface such as an PIN Encryption Pad (PED) which immediately encrypts the PIN. The merchant sends an authorization request to its acquirer along with the encrypted PIN using a PIN Encryption Key (PEK) $K_1$ established between the merchant and the acquirer—$K_1$ (PIN) The acquirer is the merchant's financial institution, providing authorization and ultimately payment to the merchant. Acquirers and issuers communicate over payment networks. For example, the acquirer forwards the authorization request to the payment network with the encrypted PIN using another PEK $K_2$ established between the Acquirer and Network—$K_2$ (PIN). The payment network routes the authorization request to the issuer with the encrypted PIN using a different PEK $K_3$ established between the network and the issuer—$K_3$ (PIN).

The PIN is encrypted by the merchant at the point of entry (e.g., at the PED) and remains encrypted until the issuer can verify the PIN. Accordingly, the acquirer and the network perform a PIN translation. The encrypted PIN is sent to the Hardware Security Module (HSM), decrypted inside the HSM, re-encrypted inside the HSM, and returned to the acquirer or the network such that the PIN is never cleartext outside of the HSM except when the cardholder manually enters the PIN. Thus, only the cardholder needs to know the PIN and none of the other payment participants, merchant, acquirer, network, or even the issuer needs access to the cleartext PIN. However, the merchant and acquirer, the acquirer and the network, and the network and the issuer are required to synchronize the various PEKs amongst themselves, for example, by establishing separate Key Encryption Keys (KEKs) between the participating pairs and changing PEKs according to the operating rules of the various participants. In some examples, typical network rules mandate that the PEK is changed every 1,500 transactions or hourly, whichever occurs first.

The Primary Account Number (PAN) is a 12-19 digit number associated with a payment card. The protection of the PAN during an authorization request is point-to-point encryption, between each participant, whereas the protection of the PIN is end-to-end encryption, from the merchant to the issuer. The issuer is the cardholder's financial institution, providing a payment card with PAN to the cardholder. The issuer also receives authorization request from a payment network for purchase approval, based on the transaction amount, aggregate amount, transaction frequency, merchant location, and other proprietary risk criteria. The cardholder uses the payment card at a merchant location and swipes, inserts, or taps the card using a Point-of-Sale (POS) terminal. The cardholder might use the payment card at an online merchant page/site and manually enters the card information. The merchant sends an authorization request to the acquirer along with the encrypted PAN using an encryption key ($K_1$) established between the merchant and the acquirer—$K_1$ (PAN). The acquirer is the merchant's financial institution and ultimately provides payment to the merchant. Acquirers and issuers communicate over payment networks, so the acquirer forwards the authorization request to the payment network with the encrypted PAN using another key $K_2$ established between the acquirer and network—$K_2$ (PAN). Some acquirers have access to multiple networks, so the acquirer can route the authorization request based on the PAN. The network routes the authorization request based on the PAN to the appropriate issuer with the encrypted PAN using a different key $K_3$ established between the network and issuer—$K_3$ (PAN).

PAN encryption is point-to-point among any two of merchant, acquirer, payment network, and issuer, to protect the PAN during transmission, but not during processing by each participant. PAN-based routing uses the Bank Institution Number (BIN) which is the first six digits of the PAN, assigned by the American Bankers Association (ABA) to issuers, but has been expanded by the ISO 7812 standard to the first eight digits. Further, PAN encryption recommends but does not require HSM.

Protected Healthcare Information (PHI) is another data category that needs encryption during transmission. Many conventional implementations of PHI protection rely on security protocols such as Transport Layer Security (TLS) to encrypt whole data packets, compromising the message or file without regard to the actual PHI elements. Such encryption is point-to-point and basically all or nothing. PHI encryption may eventually use more granular data-element specific cryptographic keys, similar to PIN and PAN encryption. Currently, the healthcare industry is migrating to a newer ISO 20022 messages.

Personally Identifiable Information (PII) is another data category that needs encryption during transmission. Currently, most organizations privacy practices are immature to address PII encryption. PII encryption may eventually use granular data-element specific cryptographic keys, a likely outcome from the ISO 20022 efforts.

The arrangements disclosed herein relate to systems, apparatuses, methods, and non-transitory computer-readable media for Secure Node Exchange Attribute-based Keys (SNEAK) including secure exchange of sensitive message elements between sequential message nodes using attribute-based key management. Each message node can access none, one, some, or all encrypted message elements based on assigned attributes of that message node. A key management node provides key exchange for each Content Encryption Key (CEK) used to protect the message elements based on attributes of the message nodes.

Figure 1B:
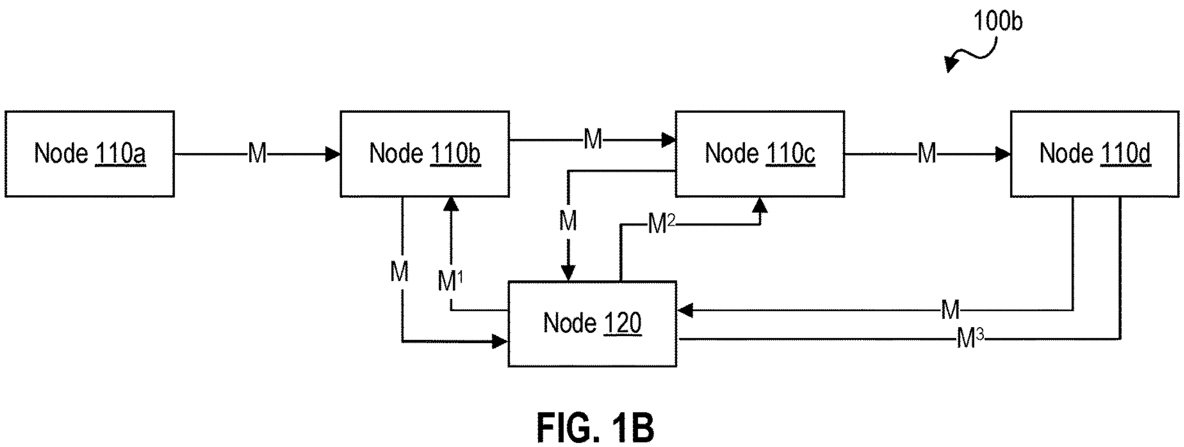
FIG. 1B is a diagram illustrating an example method for exchanging message elements via a key management node, according to various arrangements.
Figure 2:
FIG. 2 is a table illustrating example contents of the messages communicated among the message nodes and the key management node as shown in FIGS. 1A and 1B, according to various arrangements.

FIG. 1A is a diagram illustrating an example method 100*a* for exchanging message elements via a key management node 120, according to various arrangements. The method 100*a* is a pre-message key translation method in which a cryptographic key (e.g., a KEK) used to establish a CEK is translated by the key management node 120 before the sender node sends the message to a recipient node. FIG. 1B is a diagram illustrating an example method 100*b* for exchanging message elements via a key management node 120, according to various arrangements. The method 100*b* is a post-message key translation method in which a cryptographic key (e.g., a KEK) used to establish a CEK is translated by the key management node 120 after the recipient node receives the message from the sender node. FIG. 2 is a table 200 illustrating example contents of the messages M, $M^1$, $M^2$, and $M^3$ communicated among the message nodes 110*a*, 110*b*, 110*c*, and 110*d* and the key management node 120 as shown in FIGS. 1A and 1B, according to various arrangements. In FIG. 1A, the key management node 120 does not directly communicate with the node 110*d*. In FIG. 1B, the key management node 120 does not directly communicate with the node 110*a*.

The methods 100*a* and 110*b* can be performed by message nodes 110*a*, 110*b*, 110*c*, 110*d* and the key management node 120. Each message node 110*a*, 110*b*, 110*c*, or 110*d* or the key management node 120 can be a suitable computing system such as a desktop computer, laptop computer, smart phone, tablet, server, datacenter, cloud-based computing systems, and so on. In some examples, the message node 110*a* is an original source and original encrypting entity of the message components of various messages. In some examples, each of the message nodes 110*b*, 110*c*, and 110*d* can be operated by an entity for which at least one message component of a message is intended. In some arrangements, each of the message nodes 110*a*, 110*b*, 110*c*, and 110*d* can be operated by an entity of a payment process or transaction process (e.g., a credit char transaction, a debit card transaction, a cryptocurrency transaction, and so on).

A message can include a plurality of message elements (e.g., portions, chunks, partitions, and so on) denoted as $m_1$, $m_2$, $m_3$, e.g., MESSAGE=$m_1$, $m_2$, $m_3$. In some arrangements, the message elements can be in cleartext, and each message element can be encrypted to generate an encrypted message element. Examples of each message element can include a PIN, a PAN (e.g., a credit card number, a debit card number, and the like), PHI, PII, a financial account number, a password, social security number, a name, an address, an email address, a Merchant Category Code (MCC), Personally Identifiable Information (PII), Protected Health Information (PHI), or so on. In some examples, a message element can be or include a cryptographic key, a token, a certificate, or the like. In some examples, each message element can be a seed for key-generation (e.g., for generating a One-Time-Password (OTP)).

In some arrangements, the message node 110*a* can be a computing system operated by a merchant, the message node 110*b* can be a computing system operated by an acquirer, the message node 110*c* can be a computing system operated by a payment network or a privacy supplier, and the message node 110*d* can be a computing system operated by an issuer. The payment network can determine an interchange rate. For example, message element $m_1$ can be a PAN, message element $m_2$ can be a PIN, and message element $m_3$ can be an MCC, and so on. The message and the message elements refer to any information that needs protection during transmission and storage.

Each message element can be encrypted using a respective CEK. For example, the message element $m_1$ is encrypted using $CEK_1$, e.g., $CEK_1(m_1)$. The message element $m_2$ is established $CEK_2$, e.g., $CEK_2(m_2)$. The message element $m_3$ is encrypted using $CEK_3$, e.g., $CEK_3(m_3)$. Each CEK used to encrypt a message element can be a random CEK or a CEK generated using a random number. For example, a random number can be inputted into a Key Derivation Function (KDF) to generate a random CEK, or the random CEK itself can be a random number. Each message node 110*b*, 110*c*, or 110*d* can decrypt only an encrypted message element for which that message node has a corresponding CEK. Otherwise, the encrypted message element is ignored and forwarded as-encrypted to the next message node.

In some examples, the key management node 120 and each of the nodes 110*a*, 110*b*, 110*c*, and 110*d* and can establish a CEK via suitable Public Key Infrastructure (PKI), such as Rivest-Shamir-Adleman (RSA), Diffie-Hellman (DH), Elliptic-Curve DH (ECDH), Kyber modified by NIST and renamed Module-Lattice-Based Key-Encapsulation Mechanism (ML-KEM), and so on. In some examples, establishing the CEK includes establishing a KEK, which is used to encrypt or decrypt the CEK. The KEK can be used to encrypt, decrypt, or otherwise establish the CEK. In some examples, two nodes (e.g., the key management node 120 and one of the nodes 110*a*, 110*b*, 110*c*, and 110*d*) can establish a CEK, including a first node encrypting the CEK using a first KEK and a second node decrypting the encrypted CEK using a second KEK, where the first KEK and the second KEK can be the same (in a symmetrical scheme) or different (asymmetric scheme). Examples of the KEK include $X_P$, $B_P$, $C_P$, and $D_P$. In some arrangements, a first node determines KEK[CEK] using the CEK and the KEK by encrypting a CEK with the KEK. In some arrangements, a second node determines the CEK from KEK[CEK] using a KEK by decrypting KEK[CEK] using the KEK (the same KEK such as a public key used to encrypt the CEK or a private key corresponding to the public key used to encrypt the CEK). Generally, the expression KEK[CEK] refers to establishing the CEK by the two nodes using at least one cryptographic key, including establishing the at least one cryptographic key (including KEK), encrypting the CEK using a cryptographic key (e.g., KEK), decrypting KEK [CEK] using a cryptographic key (e.g., KEK or a private key corresponding to the KEK). In some examples, translating the same CEK includes determining CEK from $KEK_1$[CEK] using $KEK_1$ (or a private key corresponding to $KEK_1$) and determining $KEK_2$[CEK] using $KEK_2$.

In some arrangements, in RSA, establishing a CEK includes a first node encrypting the CEK using public key encryption (e.g., using a public key KEK) to determine KEK[CEK] and a second node decrypting the CEK using a private key related to the public key KEK to determine CEK from KEK[CEK], where the public and the private keys form a public/private key pair and are mathematically related to each other.

In DH or ECDH, establishing a CEK includes the first node and the second node exchanging their respective public keys to establish a KEK, the first node determining KEK [CEK] by encrypting CEK using the KEK, and the second node determining CEK from KEK[CEK] by decrypting KEK[CEK] using the same KEK.

In Kyber (ML-KEM), establishing a CEK includes the first node and the second node establishing an ephemeral public and private key pair to establish a KEK, the first node determining KEK[CEK] by encrypting CEK using the KEK, and the second node determining CEK from KEK[CEK] by decrypting KEK[CEK] using the same KEK. For example, the first node generates an ephemeral key pair using ML-KEM.KeyGen ( )=ek, dk, and sends ek to the second node. The second node generates shared key and ciphertext using ML-KEM.Encaps (ek)=K, c, and sends c to the first node. The first node establishes shared key K using ML-KEM-.Decaps (c, dk)=K. The shared key K can then be used as the KEK to encrypt and decrypt in the manner described. Given that the asymmetric keys are ephemeral, the asymmetric keys are used once to generate the shared key K and destroyed, such that every Kyber key exchange uses a new ephemeral key pair and thus exchanges a new shared key K.

In some examples, the key management node 120 has a public key, referred to as $X_P$. The CEKs can be translated from $X_P$ to a public key of another node 110*a*, 110*b*, 110*c*, or 110*d*. For example, the message node 110*b* has a public key $B_P$, the message node 110*c* has a public key $C_P$, and the message node 110*d* has a public key $D_P$. In asymmetric algorithms, the public key $B_P$ and the private key $B_P$ of the message node 110*b* form a public/private key pair and are mathematically related to one another, the public key $C_P$ and the private key $C^P$ of the message node 110*c* form a public/private key pair and are mathematically related to one another, and the public key $D_P$ and the private key $D^P$ of the message node 110*d* form a public/private key pair and are mathematically related to one another.

Each node 110*b*, 110*c*, or 110*d* needs to access message element $m_1$ (e.g., PAN), so $CEK_1$ is reestablished or translated using the public key ($B_P$, $C_P$, or $D_P$) of each of the nodes 110*b*, 110*c*, and 110*d* for respective ones of the messages $M^1$, $M^2$, and $M^3$, referred to as translated messages. In some examples, only node 110*d* needs to access message element $m_2$ (e.g., PIN), so $CEK_2$ is reestablished or translated using the public key $D_P$ of the message node 110*d* for the message $M^3$. In some examples, only node 110*c* needs to access message element $m_3$, so $CEK_3$ is reestablished or translated using the public key $C_P$ of node 110*c* for the message $M^2$.

In the example in which each of the nodes 110*b*, 110*c*, or 110*d* needs to access message element $m_1$ (e.g., PAN), $CEK_1$ is protected in each of the messages $M^1$, $M^2$, and $M^3$ using a respective one of the public key of a corresponding node 110*b*, 110*c*, or 110*d*. For example, in message $M^1$, message components $m_1$ is encrypted using $CEK_1$. e.g., $CEK_1(m_1)$, and CEK is reestablished using a public key $B_P$ of the message node 110*b*, e.g., $B_P[CEK_1]$. In message $M^2$, message components $m_1$ is encrypted using $CEK_1$. e.g., $CEK_1$ $(m_1)$, and $CEK_1$ is reestablished using a public key $C_P$ of the message node 110*c*, e.g., $C_P[CEK_1]$. In message $M^3$, message components $m_1$ is encrypted using $CEK_1$. e.g., $CEK_1$ $(m_1)$, and $CEK_1$ is reestablished using a public key $D_P$ of the message node 110*d*, e.g., $D_P[CEK_1]$.

In the example in which only node 110*d* needs to access message element $m_2$ (e.g., PIN), in message $M^3$, message components $m_2$ is encrypted using $CEK_2$, e.g., $CEK_2(m_2)$, and $CEK_2$ is reestablished using a public key $D_P$ of the message node 110*d*, e.g., $D_P[CEK_2]$. In each of messages $M^1$ and $M^2$, $CEK_2$ is reestablished using the public key $X_P$ of the key management node 120 and not the public key $B_P$ or $C_P$ of respective one of node 110*b* or 110*c*. This prevents access of the nodes 120*b* or 120*c* to $CEK_2$ and therefore $m_2$.

In the example in which only node 110*c* needs to access message element $m_3$ (e.g., MCC), in message $M^2$, message components $m_3$ is encrypted using $CEK_3$, e.g., $CEK_3(m_3)$, and $CEK_3$ is reestablished using a public key $C_P$ of the message node 110*c*, e.g., $C_P[CEK_3]$. In each of messages $M^1$ and $M^3$, $CEK_3$ is protected using the public key $X_P$ of the key management node 120 and not the public key $B_P$ or $D_P$ of respective one of node 110*b* or 110*d*. This prevents access of the nodes 120*b* or 120*d* to $CEK_2$ and therefore $m_2$.

As shown in FIG. 1A, in the method 100*a*, the message node 110*a* generates the message M and sends the message M to the key management node 120. The message node 110*a* can encrypt each of the message components $m_1$, $m_2$, $m_3$ using a respective CEK. For example, the message node 110*a* can encrypt message element $m_1$ using $CEK_1$, encrypt message element $m_2$ using $CEK_2$, and encrypt message element $m_3$ using $CEK_3$. The message node 110*a* can establish with the node 120 each CEK using a public key $X_P$ of the key management node 120. For example, the message node 110*a* can establish with the node 120 $CEK_1$ using $X_P$, e.g., $X_P[CEK_1]$, establish $CEK_2$ using $X_P$, e.g., $X_P[CEK_2]$, and establish $CEK_3$ using $X_P$, e.g., $X_P[CEK_3]$. As shown in FIG. 2, the message M can therefore include the combination of $M=X_P[CEK_1]$, $CEK_1(m_1)$, $X_P[CEK_2]$, $CEK_2(m_2)$, $X_P[CEK_3]$, $CEK_3(m_3)$. The message node 110*a* can send the message M to the key management node 120.

The key management node 120 can convert or translate $X_P$ used to establish a CEK to a public key of one of the message nodes 110*b*, 110*c*, or 110*d* for a designated message component deemed to be accessible by that message node. A message component in a message to a message node 110*b*, 110*c*, or 110*d* deemed to be inaccessible by that message node having a CEK that is established using $X_P$, such that the CEK cannot be determined from $X_P[CEK]$ by the message node due to the lack of the establishment of $X_P$ or the private key of the key management node 120 corresponding to $X_P$.

For example, in response to receiving the message M from the message node 110*a*, the key management node 120 can determine based on an identifier (ID) of the message node 110*b* received from the message node 110*a* with the message M, indicating that at least one message element in M is intended to be provided to the message node 110*b* in a next hop. The ID can include a name, ID, link (e.g., a Uniform Resource Identifier (URI), a Uniform Resource Locator (URL), a Uniform Resource Name (URN)), an address, and so on that can identify the message node 110*b* or its operator. The key management node 120 reestablishes $CEK_1$ from one public key $X_P$ to another public key $B_P$ for message element $m_1$ by determining $CEK_1$ using $X_P$ (or using private key $X^P$ corresponding to $X_P$) and determining $B_P[CEK_1]$ using $B_P$. The public key $X_P$ and the private key $X^P$ of the key management node 120 form a public/private key pair and are mathematically related to one another. The key management node 120 generates the message $M^1=B_P[CEK_1]$, $CEK_1(m_1)$, $X_P[CEK_2]$, $CEK_2(m_2)$, $X_P[CEK_3]$, $CEK_3(m_3)$ and sends the message $M^1$ to the message node 110*a*.

The message node 110*a* forwards message $M^1$ to the message node 110*b*. The message node 110*b* receives message $M^1$ and determines $CEK_1$ from $B_P[CEK_1]$ using $B_P$ or its private key $B_P$ of the message node 110*b*. The message node 110*b* can use $CEK_1$ to decrypt the encrypted message element $CEK_1(m_1)$ to obtain $m_1$. Given that the message node 110*b* lacks the private key of the key management node 120, the message node 110*b* cannot establish $CEK_2$, and $CEK_3$, and therefore cannot decrypt $CEK_2(m_2)$ or $CEK_3(m_3)$.

The message node 110*b* can determine $X_P[CEK_1]$ and generate the message $M=X_P[CEK_1]$, $CEK_1(m_1)$, $X_P[CEK_2]$, $CEK_2(m_2)$, $X_P[CEK_3]$, $CEK_3(m_3)$. The message node 110*b* can send the message M to the key management node 120.

In response to receiving the message M from the message node 110*b*, the key management node 120 can determine based on an ID received from the message node 110*b* with the message M that at least one message element in M is intended to be provided to the message node 110*c* in a next hop. The ID can include a name, ID, link (e.g., a URI, URL, a URN), an address, and so on that can identify the message node 110*c* or its operator. The key management node 120 reestablishes to another public key $C_P$ $CEK_1$) for message element $m_1$ and $CEK_3$) for message element $m_3$ by determining $CEK_1$ and $CEK_3$ using $X_P$ (or using private key $X^P$ corresponding to $X_P$) and determining $C_P[CEK_1]$ and $C_P[CEK_3]$ using public key $C_P$ of the message node 110*c*. The key management node 120 generates the message $M^2=C_P[CEK_1]$, $CEK_1(m_1)$, $X_P[CEK_2]$, $CEK_2(m_2)$, $C_P[CEK_3]$, $CEK_3(m_3)$ and sends the message $M^2$ to the message node 110*b*.

The message node 110*b* forwards message $M^2$ to the message node 110*c*. The message node 110*c* receives message $M^2$ and determines $CEK_1$ from $C_P[CEK_1]$ and $CEK_3$ from $C_P[CEK_3]$ using $C_P$ or its private key $C_P$ of the message node 110*c*. The message node 110*c* can use $CEK_1$ to decrypt the encrypted message element $CEK_1(m_1)$ to obtain $m_1$. The message node 110*c* can use $CEK_3$ to decrypt the encrypted message element $CEK_3(m_3)$ to obtain $m_3$. Given that the message node 110*c* lacks the private key of the key management node 120, the message node 110*c* cannot establish $CEK_2$, and therefore cannot decrypt $CEK_2(m_2)$.

The message node 110*c* can determine $X_P[CEK_1]$ and $X_P[CEK_3]$ and generate the message $M=X_P[CEK_1]$, $CEK_1(m_1)$, $X_P[CEK_2]$, $CEK_2(m_2)$, $X_P[CEK_3]$, $CEK_3(m_3)$. The message node 110*c* can send the message M to the key management node 120.

In response to receiving the message M from the message node 110*c*, the key management node 120 can determine based on an ID received from the message node 110*c* with the message M that at least one message element in M is intended to be provided to the message node 110*d* in a next hop. The ID can include a name, ID, link (e.g., a URI, URL, a URN), an address, and so on that can identify the message node 110*d* or its operator. The key management node 120 reestablishes to another public key $D_P$ $CEK_1$ for message element $m_1$ and $CEK_2$ for message element $m_2$ by determining CEK, and $CEK_2$ using $X_P$ (or using a private key $X^P$ corresponding to $X_P$) and determining $D_P[CEK_1]$ and $D_P[CEK_2]$ using public key $D_P$ of the message node 110*d*. The key management node 120 generates the message $M^3=D_P[CEK_1]$, $CEK_1(m_1)$, $D_P[CEK_2]$, $CEK_2(m_2)$, $X_P[CEK_3]$, $CEK_3(m_3)$ and sends the message $M^3$ to the message node 110*c*.

The message node 110*c* forwards message $M^3$ to the message node 110*d*. The message node 110*d* receives message $M^3$ determines $CEK_1$ from $D_P[CEK_1]$ and $CEK_2$ from $D_P[CEK_2]$ using $D_P$ or its private key $D^P$ of the message node 110*d*. The message node 110*d* can use $CEK_1$ to decrypt the encrypted message element $CEK_1(m_1)$ to obtain $m_1$. The message node 110*d* can use $CEK_2$ to decrypt the encrypted message element $CEK_2(m_2)$ to obtain $m_2$. Given that the message node 110*d* lacks the private key of the key management node 120, the message node 110*d* cannot establish $CEK_3$, and therefore cannot decrypt $CEK_3(m_3)$.

As shown in FIG. 1B, in the method 100*b*, the message node 110*a* generates the message M and sends the message M to the message node 110*b*, which sends the message M to the key management node 120. For example, the message node 110*a* can generate the CEKs $CEK_1$, $CEK_2$, and $CEK_3$ by inputting a random number into a KDF or each CEK itself can be a random number. The message node 110*a* can encrypt each of the message components $m_1$, $m_2$, $m_3$ using a respective CEK. For example, the message node 110*a* can encrypt message element $m_1$ using $CEK_1$, encrypt message element $m_2$ using $CEK_2$, and encrypt message element $m_3$ using $CEK_3$. The message node 110*a* can establish with the node 120 each CEK using a public key $X_P$ of the key management node 120. For example, the message node 110*a* can establish with the node 120 $CEK_1$ using $X_P$, e.g., $X_P[CEK_1]$, establish $CEK_2$ using $X_P$, e.g., $X_P[CEK_2]$, and establish $CEK_3$ using $X_P$, e.g., $X_P[CEK_3]$. As shown in FIG. 2, the message M can therefore include the combination of $M=X_P[CEK_1]$, $CEK_1(m_1)$, $X_P[CEK_2]$, $CEK_2(m_2)$, $X_P[CEK_3]$, $CEK_3(m_3)$.

The key management node 120 can convert or translate $X_P$ used to establish a CEK to a public key of one of the message nodes 110*b*, 110*c*, or 110*d* for a designated message component deemed to be accessible by that message node. A message component in a message to a message node 110*b*, 110*c*, or 110*d* deemed to be inaccessible by that message node having a CEK that is established using $X_P$, such that the CEK cannot be determined from $X_P[CEK]$ by the message node due to the lack of the establishment of $X_P$ or the private key of the key management node 120 corresponding to $X_P$.

For example, in response to receiving the message M from the message node 110*b*, the key management node 120 can determine based on an ID of the message node 110*a* received from the message node 110*b* with the message M indicating that at least one message element in M is intended to be provided by the message node 110*a* to the message node 110*b* in a previous hop. The ID can include a name, ID, link (e.g., a URI, a URL, a URN), an address, and so on that can identify the message node 110*a* or its operator. The key management node 120 reestablish $CEK_1$ from one public key $X_P$ to another public key $B_P$ for message element $m_1$ by determining $CEK_1$ using $X_P$ (or using private key $X^P$ corresponding to $X_P$) and determining $B_P[CEK_1]$ The public key $X_P$ and the private key $X^P$ of the key management node 120 form a public/private key pair and are mathematically related to one another. The key management node 120 generates the message $M^1=B_P[CEK_1]$, $CEK_1(m_1)$, $X_P[CEK_2]$, $CEK_2(m_2)$, $X_P[CEK_3]$, $CEK_3(m_3)$ and sends the message $M^1$ to the message node 110*b*.

The message node 110*b* receives message $M^1$ and determines $CEK_1$ from $B_P[CEK_1]$ using $B_P$ or its private key $B_P$ of the message node 110*b*. The message node 110*b* can use $CEK_1$ to decrypt the encrypted message element $CEK_1(m_1)$ to obtain $m_1$. Given that the message node 110*b* lacks the private key of the key management node 120, the message node 110*b* cannot establish $CEK_2$, and $CEK_3$, and therefore cannot decrypt $CEK_2(m_2)$ or $CEK_3(m_3)$.

The message node 110*b* can determine $X_P[CEK_1]$ and generate the message $M=X_P[CEK_1]$, $CEK_1(m_1)$, $X_P[CEK_2]$, $CEK_2(m_2)$, $X_P[CEK_3]$, $CEK_3(m_3)$. The message node 110*b* can send the message M to the message node 110*c*. The message node 110*c* sends the message M to the key management node 120.

In response to receiving the message M from the message node 110*c*, the key management node 120 can determine based on an ID of the message node 110*b* received from the message node 110*c* with the message M indicating that at least one message element in M is intended to be provided by the message node 110*b* to the message node 110*c* in a previous hop. The ID can include a name, ID, link (e.g., a URI, a URL, a URN), an address, and so on that can identify the message node 110*b* or its operator. The key management node 120 reestablishes to another public key $C_P$ $CEK_1$ for message element $m_1$ and $CEK_3$ for message element $m_3$ by determining $CEK_1$ and $CEK_3$ using $X_P$ (or using private key $X^P$ corresponding to $X_P$) and determining $C_P[CEK_1]$ and $C_P[CEK_3]$ using public key $C_P$ of the message node 110*c*. The key management node 120 generates the message $M^2=C_P[CEK_1]$, $CEK_1(m_1)$, $X_P[CEK_2]$, $CEK_2(m_2)$, $C_P[CEK_3]$, $CEK_3(m_3)$ and sends the message $M^2$ to the message node 110*c*.

The message node 110*c* receives message $M^2$ and determines $CEK_1$ from $C_P[CEK_1]$ and $CEK_3$ from $C_P[CEK_3]$ using $C_P$ or its private key $C_P$ of the message node 110*c*. The message node 110*c* can use $CEK_1$ to decrypt the encrypted message element $CEK_1(m_1)$ to obtain $m_1$. The message node 110*c* can use $CEK_3$ to decrypt the encrypted message element $CEK_3(m_3)$ to obtain $m_3$. Given that the message node 110*c* lacks the private key of the key management node 120, the message node 110*c* cannot decrypt $CEK_2$, and therefore cannot decrypt $CEK_2(m_2)$.

The message node 110*c* can determine $X_P[CEK_1]$ and $X_P[CEK_3]$ and generate the message $M=X_P[CEK_1]$, $CEK_1(m_1)$, $X_P[CEK_2]$, $CEK_2(m_2)$, $X_P[CEK_3]$, $CEK_3(m_3)$. The message node 110*c* can send the message M to the message node 110*d*. The message node 110*c* can send the message M to the key management node 120.

In response to receiving the message M from the message node 110*f*, the key management node 120 can determine based on an ID of the message node 110*c* received from the message node 110*d* with the message M indicating that at least one message element in M is intended to be provided by the message node 110*c* to the message node 110*d* in a previous hop. The ID can include a name, ID, link (e.g., a URI, a URL, a URN), an address, and so on that can identify the message node 110*c* or its operator. The key management node 120 reestablishes to another public key $D_P$ $CEK_1$ for message element $m_1$ and $CEK_2$ for message element $m_2$ by determining $CEK_1$ and $CEK_2$ using $X_P$ (or using a private key $X^P$ corresponding to $X_P$) and determining $D_P[CEK_1]$ and $D_P[CEK_2]$ using public key $D_P$ of the message node 110*d*. The key management node 120 generates the message $M^3=D_P[CEK_1]$, $CEK_1(m_1)$, $D_P[CEK_2]$, $CEK_2(m_2)$, $X_P[CEK_3]$, $CEK_3(m_3)$ and sends the message $M^3$ to the message node 110*d*.

The message node 110*d* receives message $M^3$ and determines CEK from $D_P[CEK_1]$ and $CEK_2$ from $D_P[CEK_2]$ using $D_P$ or its private key $D^P$ of the message node 110*d*. The message node 110*d* can use $CEK_1$ to decrypt the encrypted message element $CEK_1(m_1)$ to obtain $m_1$. The message node 110*d* can use $CEK_2$ to decrypt the encrypted message element $CEK_2(m_2)$ to obtain $m_2$. Given that the message node 110*d* lacks the private key of the key management node 120, the message node 110*d* cannot establish $CEK_3$, and therefore cannot decrypt $CEK_3(m_3)$.

In some examples, a message node 110*b* or 110*c* can identify a next message node (e.g., a next hop) based on at least a portion of the message component after determining that portion of the message. For example, in response to determining $m_1$ (e.g., a PAN) by the message node 110*b* (e.g., acquirer), the message node 110*b* can look up at least a portion or the entirety of the PAN to identify the message node 110*c* (e.g., the payment network) that can service the PAN. The lookup datable can be stored in a memory or database of the message node 110*b*.

In some examples, instead of the message nodes 110*b* and 110*c* in the method 100*a* and the message nodes 110*c* and 110*d* in the method 100*b* sending the message M to the key management node 120 to trigger translation for the messages $M^2$ and $M^3$, those message nodes can send a request including suitable ID or indicator that references M received by the key management node 120 from the node 110*a* in the method 100*a* and from the node 110*b* in the method 100*b*. In that regard, the key management node 120 can store the received M in a secure storage for later retrieval. A message node's request further includes an ID of a message node to which the translated messages $M^1$, $M^2$, and $M^3$ is intended to be sent (e.g., in the method 100*a*) and/or an ID of a message node from which the untranslated message M is received (e.g., in the method 100*b*).

The SNEAK mechanism further includes attribute-based access control can allow or deny access to information or data by allowing or denying the translation of cryptographic keys based on one or more of at least one attribute of the sender message node, at least one attribute of the recipient message node, or at least one attribute of the message component or encrypted message component for which key translation is needed. Each sender message node, recipient message node, or the message component/encrypted message component can have one or more attributes, and each attribute can change or remain static from time to time. A policy engine of the key management node 120 can allow or deny key translation according to such attributes. SNEAK is a type of attribute-based access control that allows a party to decrypt one of multiple message components of a message by selectively encrypting a CEK used to decrypt the message component.

For example, the message node 110*a* has an attribute (e.g., a group name) of "merchant," the message node 110*b* has an attribute of "acquirer," the message node 110*c* has an attribute of "payment network" or "privacy supplier," and the message node 110*d* has an attribute of "issuer." The message node 110*c* can route traffic to another node in response to determining privacy information based on which node 110*c* can route the traffic to another node. For example, the message elements $m_1$ has the attribute (e.g., type) of a "PAN," $m_2$ has the attribute of a "PIN," and $m_3$ has the attribute of an "MCC." The key management node 120 manages the attributes of the nodes 110*a*, 110*b*, 110*c*, and 110*d* and the message elements and selectively allows CEK translations between its own $X_P$ public key and the other nodes ($B_P$, $C_P$, $D_P$) public keys.

In some examples, the key management node 120 maintains a mapping table indicating of a mapping among the ID, name, and attributes of the sender message nodes, ID, name, and attributes of the recipient message nodes, and attributes of various message elements. In response to receiving a key translation request from a message node (e.g., the sender node in the method 100*a* and the receiver node in the method 100*b*) which includes an ID or name of the sender node, an ID or name of the receiver node, and the attributes of each message component or encrypted message component of M, the key management node 120 can query or look up those attributes within the mapping to table to determine whether key translation is allowed. The key translation in the manner described can be performed in response to determining that the key translation is allowed according to the table. In some examples, the mapping table includes at least one of table of "allowed" key translation attributes and a table of a "denied" key translation attributes.

In addition to key translation with provides for data confidentiality, digital signatures can be provided to provide for data integrity. For example, the key management node 120 can use another private key $Y^P$ (different from the private key $X^P$) to generate a cryptographic signature over each of the translated messages $M^1$, $M^2$, and $M^3$. The signed translated messages $M^1$, $M^2$, and $M^3$ are provided to the recipient nodes in the manner described. The recipient node verifies the cryptographic signature on a signed translated message using another public key $Y_P$ (different from the public key $X_P$) of the key management node 120 in response to receiving the signed translated message. The private key $Y^P$ and the public key $Y_P$ of the key management node 120 form a public/private key pair and are mathematically related to one another.

In some examples, the key management node 120 can use another private key $Y^P$ (different from the private key $X^P$) to generate a cryptographic signature over a message element of a translated message $M^1$, $M^2$, and $M^3$, including the message element (e.g., $B_P[CEK_1]$, $C_P[CEK_1]$, $C_P[CEK_3]$, $D_P[CEK_1]$, and $D_P[CEK_2]$) for which the key for establishing the CEK is translated. The signed translated messages $M^1$, $M^2$, and $M^3$ are provided to the recipient nodes in the manner described. The recipient node verifies the cryptographic signature on a signed message element of a translated message using another public key $Y_P$ (different from the public key $X_P$) of the key management node 120 in response to receiving the signed translated message. The private key $Y^P$ and the public key $Y_P$ of the key management node 120 form a public/private key pair and are mathematically related to one another.

For example, the key management node 120 can use another private key $Z^P$ (different from the private key $X^P$) of the key management node 120 and another public key (different from a respective one of the public keys $B_P$, $C_P$, $D_P$) of each recipient node to signcrypt (e.g., encryption and sign in one logical step) to signcrypt each of the translated messages $M^1$, $M^2$, and $M^3$. The signcrypted translated messages $M^1$, $M^2$, and $M^3$ are provided to the recipient nodes in the manner described. The recipient node verifies the signature and decrypts the signcrypted translated message using another public key $Z_P$ (different from the private key $X^P$) of the key management node 120 and another private key (different from a respective one of the private keys $B_P$, $C_P$, $D_P$) of the recipient node in response to receiving the signcrypted translated message. The private key $Z^P$ and the public key $Y_P$ of the key management node 120 form a public/private key pair and are mathematically related to one another. The private key and the public key of the recipient node used in signcryption and verifying the signature and decrypting the signcrypted translated message form a public/private key pair and are mathematically related to one another.

In some examples, the key management node 120 can use another private key $V^P$ (different from the private key $X^P$) and another public key (different from a respective one of the public keys $B_P$, $C_P$, $D_P$) of each recipient node to signcrypt (e.g., encryption and sign in one logical step) to signcrypt a message element of a translated message $M^1$, $M^2$, and $M^3$, including the message element (e.g., $B_P[CEK_1]$, $C_P[CEK_1]$, $C_P[CEK_3]$, $D_P[CEK_1]$, and $D_P[CEK_2]$) for which the key for encrypting the CEK is translated. The signcrypted translated messages $M^1$, $M^2$, and $M^3$ are provided to the recipient nodes in the manner described. The recipient node verifies the signature and decrypts the signcrypted message element of a translated message using another public key $Z_P$ (different from the private key $X^P$) of the key management node 120 and another private key (different from a respective one of the private keys $B_P$, $C_P$, $D_P$) of the recipient node in response to receiving the signcrypted translated message. The private key $Z^P$ and the public key $Y_P$ of the key management node 120 form a public/private key pair and are mathematically related to one another. The private key and the public key of the recipient node used in signcryption and verifying the signature and decrypting the signcrypted message element form a public/private key pair and are mathematically related to one another.

In some examples, the key management node 120 includes or is operatively coupled to a Time Stamp Authority (TSA) to provide a Time Stamp Token (TST) for the translated message $M^1$, $M^2$, and $M^3$ or one or more message components thereof. The TST can be provided to a relying party (e.g., the recipient node). In some arrangements in which the TSA is external to the key management node 120 and is coupled to the key management node 120 via a network, a requestor (e.g., the key management node 120) sends hashed content of the translated message or one or more message components thereof to the TSA and receives the TST from the TSA. The key management node 120 can send the original data (e.g., the translated message or one or more message components thereof) and the TST to the recipient node. The TSA can generate the TST by running the hashed content through a TST function. The TSA does not have access to the original content. The TST function can create a TST by appending a timestamp from a calibrated clock to the respective hashed content and generating a cryptographic signature, such as a digital signature, a Message Authentication Code (MAC), an Hash-based Message Authentication Code (HMAC), or a hash chain over the timestamp appended to the content. The digital signature is signed using another private key $V^P$ of the key management node 120. The cryptographic signature can be verified by the recipient using another public key $V_P$ of the key management node 120 to determine integrity provable to a trusted time indicated by the TST. The private key $X^P$ of the key management node 120 is different from the another private key $V^P$ of the key management node 120. The public key $X_P$ of the key management node 120 is different from the other public key $V_P$ of the key management node 120. The private key $V^P$ and the public key $V_P$ of the key management node 120 form a public/private key pair and are mathematically related to one another.

In some arrangements in which the TSA is or is part of the key management node 120, the key management node 120 can generate the TST by running the hashed content of the translated message or one or more message components thereof through a TST function. The TST function can create a TST by appending a timestamp from a calibrated clock to the respective hashed content and generating a cryptographic signature over the timestamp appended to the content. The digital signature is signed using another private key $V^P$ of the key management node 120. The key management node 120 can send the original data (e.g., the translated message or one or more message components thereof) and the TST to the recipient node. The cryptographic signature can be verified by the recipient using another public key $V_P$ of the key management node 120 to determine integrity provable to a trusted time indicated by the TST. The private key $V^P$ and the public key $V_P$ of the key management node 120 form a public/private key pair and are mathematically related to one another.

In some examples, the TST can be generated using one or more TST mechanisms including 1) Digital Signature Method, 2) MAC Method, 3) Linked Token Method, 4) Linked and Signed Method, and 5) Transient Key Method. Linked Token Method uses a MAC for the TST cryptographic signature while the Linked and Signed Method uses a digital signature for the TST cryptographic signature. Both methods create a chain of TST linked together using a hash algorithm. The Transient Key Method uses Elliptic Curve Digital Signature Algorithm (ECDSA) to sign each TST and changes the signature key on a regular interval and manages the ECDSA signature keys using an internal key chain. The TST is detached from the content itself.

ANSI X9.95 defines requirements and methodologies for a TSA to issue a TST. Unlike legacy timestamps which rely on synchronized clocks, TSA use calibrated clocks aligned with a National Measurement Institutes (NMI) and the International Time Authority (ITA). The Bureau International des Poids et Mesures (BIPM) near Paris, France is the official ITA that calibrates the clocks of each NMI. The two NMI in the USA is the NIST Time and Frequency Division that manages the F1 Cesium Fountain Atomic Clock and the United States Naval Observatory (USNO) which manages the Global Positioning System (GPS).

Figure 3:
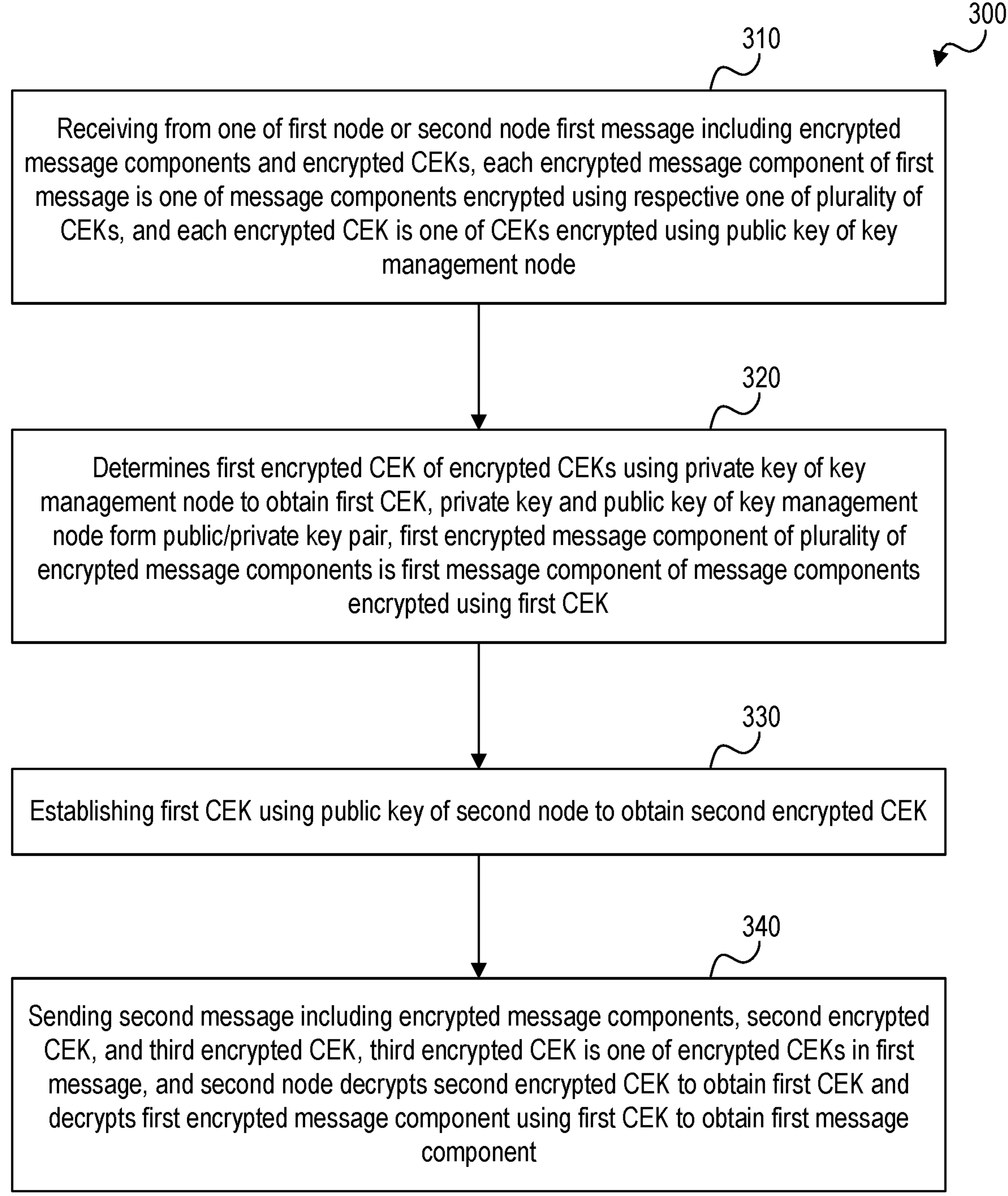
FIG. 3 is a diagram illustrating an example method for exchanging message elements via a key management node, according to various arrangements.

FIG. 3 is a process flow diagram illustrating an example method 300 for exchanging message elements via a key management node 120, according to various arrangements. The methods 100*a* and 100*b* are example implementations of the method 300.

At 310, the key management node 120 receives from a first node (e.g., a sender message node such as the node 110*a*) or a second node (e.g., a recipient message node such as the node 110*b*) a first message (e.g., $M=X_P[CEK_1]$, $CEK_1(m_1)$, $X_P[CEK_2]$, $CEK_2(m_2)$, $X_P[CEK_3]$, $CEK_3(m_3)$) including a plurality of encrypted message components (e.g., $CEK_1(m_1)$, $CEK_2(m_2)$, $CEK_3(m_3)$) and a plurality of established CEKs (e.g., $X_P[CEK_1]$, $X_P[CEK_2]$, $X_P[CEK_3]$). Each of the plurality of encrypted message components of the first message is one of a plurality of message components (e.g., $m_1$, $m_2$, $m_3$) encrypted using a respective one of a plurality of CEKs, and each of the plurality of established CEKs is one of the plurality of CEKs (e.g., $CEK_1$, $CEK_2$, and $CEK_3$) established using a public key $X_P$ of the key management node 120.

At 320, the key management node 120 determines a first established CEK (e.g., $X_P[CEK_1]$) of the plurality of established CEKs using a private key $X^P$ of the key management node 120 to obtain a first CEK (e.g., $CEK_1$). The private key $X^P$ and the public key $X_P$ of the key management node 120 form a public and private key pair. A first encrypted message component of the plurality of encrypted message components is a first message component (e.g., $m_1$) of the plurality of message components encrypted using the first CEK.

At 330, the key management node 120 establishes the first CEK using a public key (e.g., $B_P$) of the second node (e.g., the message node 110*b*) to obtain a second established CEK (e.g., $B_P[CEK_1]$). At 340, the key management node 120 sends a second message (e.g., $M^1$) including the plurality of encrypted message components, the second established CEK, and a third established CEK (e.g., $X_P[CEK_2]$ and $X_P[CEK_3]$). The third established CEK is one of the plurality of established CEKs in the first message. The second node determines the second established CEK to obtain the first CEK and determines the first encrypted message component using the first CEK to obtain the first message component.

In some arrangements such as those described relative to FIG. 1A, the key management node 120 receives the first message (e.g., M) from the first node (e.g., the message node 110*a*). The key management node 120 sends the second message (e.g., $M^1$) to the second node. The first node sends the second message to the second node in response to receiving the second message from the key management node 120. The method 300 can further include in response to receiving the first message from the first node, determining, by the key management node 120, that the first node is authorized to send the second message to the second node or that the second node is authorized to receive the second message from the first node based on one or more of at least one attribute of the first node, at least one attribute of the second node, or at least one attribute of the first message component or the first encrypted message component.

In some arrangements such as those described relative to FIG. 1B, the second node (e.g., the message node 110*b*)

receives the first message (M) from the first node (e.g., the message node 110*a*). The second node sends the first message to the key management node 120 in response to receiving the first message from the first node. The key management node 120 sends the second message (e.g., $M^1$) to the second node. The method 300 can further include in response to receiving the first message from the second node, determining, by the key management node 120, that the first node is authorized to send the second message to the second node or that the second node is authorized to receive the second message from the first node based on one or more of at least one attribute of the first node, at least one attribute of the second node, or at least one attribute of the first message component or the first encrypted message component.

In some examples, the second node identifies, based on the first message component, a third node (e.g., the message node 110*c*). For example, the second node can look up at least a portion of the first message component and identify a corresponding third node corresponding to or mapped to the portion of the first message component. In response to identifying the third node, the second node sends the first message to the key management node (e.g., in the method 100*a*) or to the third node (e.g., in the method 100*b*).

In some example, the method 300 further includes receiving, by the key management node 120 from one of the second node (e.g., a sender message node such as the node 110*b*) or a third node (e.g., a recipient message node such as the node 110*c*), the first message. The key management node 120 determines the third established CEK (e.g., $X_P[CEK_3]$) of the plurality of established CEKs using the private key $X^P$ of the key management node 120 to obtain a second CEK (e.g., $CEK_3$). A second encrypted message component (e.g., $CEK_3(m_3)$) of the plurality of encrypted message components is a second message component (e.g., $m_3$) of the plurality of message components encrypted using the second CEK. The key management node 120 establishes the second CEK using a public key (e.g., $C_P$) of the third node to obtain a fourth established CEK (e.g., $C_P[CEK_3]$). The key management node 120 sends a third message (e.g., $M^3$) including the plurality of encrypted message components and the fourth established CEK. The third node determines the fourth established CEK to obtain the second CEK and decrypts the second encrypted message component using the second CEK to obtain the second message component. In some examples, the third message further includes a fifth established CEK (e.g., $X_P[CEK_2]$). The fifth established CEK is one of the plurality of established CEKs in the first message (e.g., M). The fifth established CEK is in at least one of the first message (e.g., M) or the second message (e.g., $M^3$). In some examples, the third established CEK is established using the public key $X_P$ of the key management node 120.

In some arrangements such as those described relative to FIG. 1A, the key management node 120 receives the first message (e.g., M) from second node (e.g., the message node 110*b*). The key management node 120 sends the third message (e.g., $M^2$) to the second node. The second node sends the third message to the third node in response to receiving the third message from the key management node 120. The method 300 can further include in response to receiving the first message from the second node, determining, by the key management node 120, that the second node is authorized to send the third message to the third node or that the third node is authorized to receive the second message from the second node based on one or more of at least one attribute of the second node, at least one attribute of the third node, or at least one attribute of the second message component or the second encrypted message component.

In some arrangements such as those described relative to FIG. 1B, the third node (e.g., the message node 110*c*) receives the first message (M) from the second node (e.g., the message node 110*b*). The third node sends the first message to the key management node 120 in response to receiving the first message from the second node. The key management node 120 sends the second message (e.g., $M^1$) to the third node. The method 300 can further include in response to receiving the first message from the third node, determining, by the key management node 120, that the second node is authorized to send the third message to the third node or that the third node is authorized to receive the third message from the second node based on one or more of at least one attribute of the second node, at least one attribute of the third node, or at least one attribute of the second message component or the second encrypted message component.

In some examples, the method 300 includes generating, by the key management node 120 using another private key $Y^P$ of the key management node 120, a cryptographic signature on the second message. The signed second message is sent by the key management node 120 to the first node (e.g., in the method 100*a*, which forwards the second message to the second node) or the second node (e.g., in the method 100*b*). The second node verifies the cryptographic signature using another public key $Y_P$ of the key management node 120 in response to receiving the signed second message from the first node or from the key management node 120. The private key $X^P$ of the key management node 120 is different from the another private key $Y^P$ of the key management node 120. The public key $X_P$ of the key management node 120 is different from the another public key $Y_P$ of the key management node 120.

In some examples, the method 300 includes signcrypting, by the key management node 102, the second message. The signcrypted second message is sent to the (e.g., in the method 100*a*, which forwards the second message to the second node) or the second node (e.g., in the method 100*b*). The second node verifies and decrypts the signcrypted second message in response to receiving the signed second message from the first node or from the key management node 120.

In some examples, the method 300 includes determining, by the key management node 120, a TST for the second message. The TST includes a cryptographic signature generated over a content including a hash of the second message and a timestamp. The digital signature is signed using another private key $V^P$ of the key management node 120. The key management node sends to the first node (e.g., in the method 100*a*) or the second node (e.g., in the method 100*b*) the TST along with the second message. The second node verifies the cryptographic signature using another public key $V_P$ of the key management node 120 in response to receiving the TST from the first node or from the key management node 120. The private key $X^P$ of the key management node 120 is different from the another private key $V^P$ of the key management node 120. The public key $X_P$ of the key management node 120 is different from the another public key $V_P$ of the key management node 120. The private key $X^P$ and public key $X_P$ of the key management node 120 form a.

Accordingly, the SNEAK methods described herein can address all the end-to-end, point-to-point, encryption digital signature, and signcryption, e.g., for ISO20022. For example, SNEAK allows Participants (e.g., the message nodes) to have attributes which govern message elements accessibility. Message elements have attributes which govern encryption keys accessibility. Encryption key translation can occur by the sender node or the recipient node. Attributes are managed by a common node (e.g., the key management node) within the message domain (e.g. authorization request). Message domains are assigned the common node to perform encryption keys translations.

The communications (e.g., transmission and reception of data) among the message nodes and the key management node can be performed over a suitable communication link shown as arrows in FIGS. 1A and 1B. Each of the communication link can be a wireless communication link such as any suitable Local Area Network (LAN), Wide Area Network (WAN), satellite communication network, or a combination thereof. For example, each communication link can be supported by Frequency Division Multiple Access (FDMA), Time Division Multiple Access (TDMA), Code Division Multiple Access (CDMA) (particularly, Evolution-Data Optimized (EVDO)), Universal Mobile Telecommunications Systems (UMTS) (particularly, Time Division Synchronous CDMA (TD-SCDMA or TDS) Wideband Code Division Multiple Access (WCDMA), Long Term Evolution (LTE), evolved Multimedia Broadcast Multicast Services (eMBMS), High-Speed Downlink Packet Access (HSDPA), and the like), Universal Terrestrial Radio Access (UTRA), Global System for Mobile Communications (GSM), Code Division Multiple Access 1× Radio Transmission Technology (1×), General Packet Radio Service (GPRS), Personal Communications Service (PCS), 802.11X, ZigBee, Bluetooth, Wi-Fi, non-radio frequency communication networks (such as infrared networks, ultraviolet networks, laser networks), a combination thereof, and/or the like. Each communication link is structured to permit the exchange of data, values, parameters, signals, instructions, messages, and the like.

Figure 4:
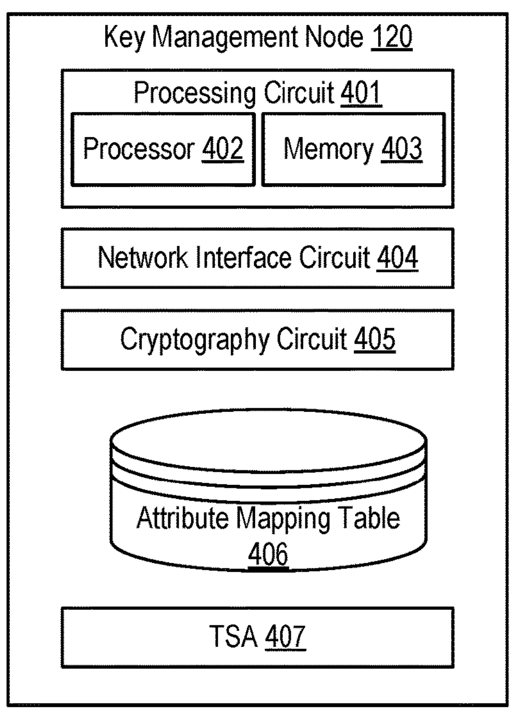
FIG. 4 illustrates block diagrams of an example key management node and an example message node, according to some arrangements.
Figure 4:
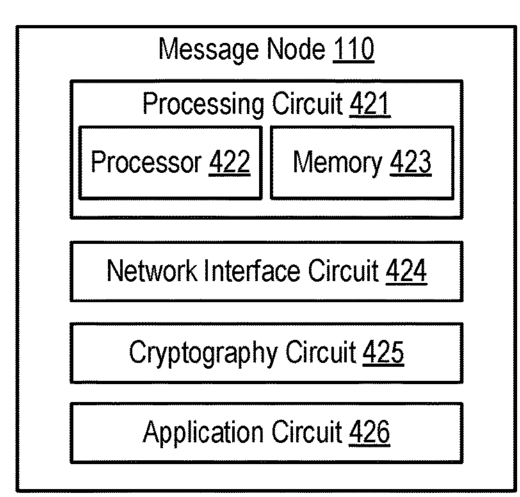

FIG. 4 illustrates block diagrams of an example key management node 120 and an example message node 110, according to some arrangements. The message node 110 is an example of each of the message nodes 110*a*, 110*b*, 110*c*, and 110*d*.

The key management node 120 can be a suitable computing system such as a desktop computer, laptop computer, smart phone, tablet, server, on-premise computing system, datacenter, cloud computing system, and so on. The key management node 120 is shown to include various circuits and logic for implementing the operations described herein. More particularly, the key management node 120 includes one or more of a processing circuit 401, a network interface circuit 404, a cryptography circuit 405, an attribute mapping table 406, and a TSA 407. While various circuits, interfaces, and logic with particular functionality are shown, it should be understood that the key management node 120 includes any number of circuits, interfaces, and logic for facilitating the operations described herein. For example, the activities of multiple circuits are combined as a single circuit and implemented on a same processing circuit (e.g., the processing circuit 401), as additional circuits with additional functionality are included.

In some arrangements, the processing circuit 401 includes a processor 402 and a memory 403. The processor 402 is implemented as a general-purpose processor, an Application Specific Integrated Circuit (ASIC), one or more Field Programmable Gate Arrays (FPGAs), a Digital Signal Processor (DSP), a group of processing components, or other suitable electronic processing components. The memory 403 (e.g., Random Access Memory (RAM), Read-Only Memory (ROM), Non-Volatile RAM (NVRAM), flash memory, hard disk storage, etc.) stores data and/or computer code for facilitating the various processes described herein. Moreover, the memory 403 is or includes tangible, non-transient volatile memory or non-volatile memory. Accordingly, the memory 403 includes database components, object code components, script components, or any other type of information structure for supporting the various activities and information structures described herein. The processing circuit 401 can be used to implement or control one or more of the circuits or systems 404, 405, 406, and 407.

The network interface circuit 404 is configured for and structured to establish and implement one or more communication links with user devices. For example, the network interface circuit 404 can establish one or more communication links with network interface circuits 424 of a message node 110 (e.g., a next hop) in the manner described to send data to and receive data from the message node 110 in the manner described. Accordingly, the network interface circuit 404 includes any of a cellular transceiver (for cellular standards), wireless network transceiver (for 802.11X, ZigBee, Bluetooth, Wi-Fi, or the like), satellite communication transceiver (for satellite communication standards), or a combination thereof. For example, the network interface circuit 404 may include wireless network modems, ports, baseband processors, and associated software and firmware.

The cryptography circuit 405 is configured to translate the public key of the key management node 120 to the public key of a message node 110, in the manner described herein. In that regard, the cryptography circuit 405 is configured to perform cryptographic operations such as encrypting data, decrypting data, encrypting another cryptographic material (e.g., another cryptographic key), decrypting another cryptographic material, signing data, verifying data, signcrypting data, and so on.

The attribute mapping table 406 can be stored in a suitable database or memory. The attribute mapping table 406 provides attribute mapping of the ID, name, and attributes of the sender message nodes, ID, name, and attributes of the recipient message nodes, and attributes of various message elements. As described, in response to receiving a key translation request from a message node 110 including attributes of one or more of the sender node, the receiver node, and message component or encrypted message component, the attribute mapping table 406 can queried or looked up according to those attributes to determine whether key translation is allowed.

The key management node 120 can further include the TSA 407. Alternatively, the key management node 120 can be communicable coupled to the TSA 406 via a suitable network. The TSA 407 can generate the TST in the manner described.

The message node 110 can include a suitable computing system such as a desktop computer, laptop computer, smart phone, tablet, server, on-premise computing system, datacenter, cloud computing system, and so on. The message node 110 is shown to include various circuits and logic for implementing the operations described herein. More particularly, the message node 110 includes one or more of a processing circuit 421, a network interface circuit 424, a cryptography circuit 425, and an application circuit 426. While various circuits, interfaces, and logic with particular functionality are shown, it should be understood that the message node 110 includes any number of circuits, interfaces, and logic for facilitating the operations described herein. For example, the activities of multiple circuits are combined as a single circuit and implemented on a same processing circuit (e.g., the processing circuit 421), as additional circuits with additional functionality are included.

In some arrangements, the processing circuit 421 has a processor 422 and memory 423. The processor 422 is a processing component such as the processor 402. The memory 423 is a memory device such as the memory 403. The processing circuit 421 can be used to implemented one or more of the circuits 424, 425, and 426.

The network interface circuit 424 is configured for and structured to establish and implement one or more communication link with the network interface 404 of the key management node 120 or the network interface 424 of another message node 110. Accordingly, the network interface circuit 424 includes any of a cellular transceiver (for cellular standards), wireless network transceiver (for 802.11X, ZigBee, Bluetooth, Wi-Fi, or the like), satellite communication transceiver (for satellite communication standards), or a combination thereof. For example, the network interface circuit 424 may include wireless network modems, ports, baseband processors, and associated software and firmware.

The cryptography circuit 425 is configured for encrypting data, decrypting data, encrypting another cryptographic material (e.g., another cryptographic key), decrypting another cryptographic material, verifying data, verifying a signature and decrypting data, and so on in the manner described. The application circuit 426 executes an application, software, firmware, or code for which cryptographic operations are needed to encrypt data, decrypt data, encrypt another cryptographic material, decrypt another cryptographic material, sign data, verify data, signcrypt data, verifying a signature and decrypting data, and so on. For example, the application circuit 426 can execute processes and operations relating to a merchant, acquirer, payment network, privacy supplier, issuer, Point of Sale (POS), mobile banking application, mobile wallet, browser, word processing application, a mobile banking application, a mobile wallet, a Graphic User Interface (GUI), an email reader/client, a File Transfer Protocol (FTP) client, a virtual machine application, and so on. For example, application circuit 426 can execute an application, software, firmware, or code for which data (e.g., message, code, document, file, program or application, etc.) needs to be encrypted, decrypted, signed, or for which a signature on the signed data needs to be verified.

As utilized herein, the terms "approximately," "substantially," and similar terms are intended to have a broad meaning in harmony with the common and accepted usage by those of ordinary skill in the art to which the subject matter of this disclosure pertains. It should be understood by those of ordinary skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

Although only a few arrangements have been described in detail in this disclosure, those skilled in the art who review this disclosure will readily appreciate that many modifications are possible (e.g., variations in sizes, dimensions, structures, shapes, and proportions of the various elements, values of parameters, mounting arrangements, use of materials, colors, orientations, etc.) without materially departing from the novel teachings and advantages of the subject matter described herein. For example, elements shown as integrally formed may be constructed of multiple components or elements, the position of elements may be reversed or otherwise varied, and the nature or number of discrete elements or positions may be altered or varied. The order or sequence of any method processes may be varied or re-sequenced according to alternative arrangements. Other substitutions, modifications, changes, and omissions may also be made in the design, operating conditions and arrangement of the various exemplary arrangements without departing from the scope of the present disclosure.

The arrangements described herein have been described with reference to drawings. The drawings illustrate certain details of specific arrangements that implement the systems, methods and programs described herein. However, describing the arrangements with drawings should not be construed as imposing on the disclosure any limitations that may be present in the drawings.

It should be understood that no claim element herein is to be construed under the provisions of 35 U.S.C. § 112 (f), unless the element is expressly recited using the phrase "means for."

As used herein, the term "circuit" may include hardware structured to execute the functions described herein. In some arrangements, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some arrangements, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some arrangements, the one or more processors may be embodied in various ways. The one or more processors may be constructed in a manner sufficient to perform at least the operations described herein. In some arrangements, the one or more processors may be shared by multiple circuits (e.g., circuit A and circuit B may comprise or otherwise share the same processor which, in some example arrangements, may execute instructions stored, or otherwise accessed, via different areas of memory). Alternatively or additionally, the one or more processors may be structured to perform or otherwise execute certain operations independent of one or more co-processors. In other example arrangements, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some arrangements, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for implementing the overall system or portions of the arrangements might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), a distributed ledger (e.g., a blockchain), etc. In some arrangements, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other arrangements, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example arrangements described herein.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative arrangements. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web arrangements of the present disclosure could be accomplished with standard programming techniques with rule based logic and other logic to accomplish the various database searching steps, correlation steps, comparison steps and decision steps.

The foregoing description of arrangements has been presented for purposes of illustration and description. It is not intended to be exhaustive or to limit the disclosure to the precise form disclosed, and modifications and variations are possible in light of the above teachings or may be acquired from this disclosure. The arrangements were chosen and described in order to explain the principals of the disclosure and its practical application to enable one skilled in the art to utilize the various arrangements and with various modifications as are suited to the particular use contemplated. Other substitutions, modifications, changes and omissions may be made in the design, operating conditions and arrangement of the arrangements without departing from the scope of the present disclosure as expressed in the appended claims.

What is claimed is:

1. A method, comprising:

receiving, by a key management node from one of a first node or a second node, a first message comprising a plurality of encrypted message components and a plurality of established Content Encryption Keys (CEKs), wherein each of the plurality of encrypted message components of the first message is one of a plurality of message components encrypted using a respective one of a plurality of CEKs, and wherein each of the plurality of established CEKs is one of the plurality of CEKs established using a public key of the key management node;

determining, by the key management node, a first established CEK of the plurality of established CEKs using a private key of the key management node to obtain a first CEK, wherein the private key and the public key of the key management node form a public and private key pair, a first encrypted message component of the plurality of encrypted message components is a first message component of the plurality of message components encrypted using the first CEK;

establishing, by the key management node, the first CEK using a public key of the second node to obtain a second established CEK;

sending, by the key management node, a second message comprising the plurality of encrypted message components, the second established CEK, and a third established CEK, wherein the third established CEK is one of the plurality of established CEKs in the first message, and wherein the second node determines the second established CEK to obtain the first CEK and decrypts the first encrypted message component using the first CEK to obtain the first message component;

determining, by the key management node, a Time Stamp Token (TST) for the second message, the TST comprises a cryptographic signature generated over a content comprising a hash of the second message and a timestamp, wherein the digital signature is signed using another private key of the key management node; and sending, by the key management node to the first node or the second node, the TST along with the second message, wherein the second node verifies the cryptographic signature using another public key of the key management node in response to receiving the TST from the first node or from the key management node, the private key of the key management node is different from the another private key of the key management node, and the public key of the key management node is different from the another public key of the key management node.

2. The method of claim 1, wherein the key management node receives the first message from the first node;

the key management node returns the second message to the first node; and the first node sends the second message to the second node in response to receiving the second message from the key management node.

3. The method of claim 2, further comprising in response to receiving the first message from the first node, determining, by the key management node, that the first node is authorized to send the second message to the second node or that the second node is authorized to receive the second message from the first node based on one or more of:

at least one attribute of the first node;

at least one attribute of the second node; or at least one attribute of the first message component or the first encrypted message component.

4. The method of claim 1, wherein the second node receives the first message from the first node;

the second node sends the first message to the key management node in response to receiving the first message from the first node; and the key management node sends the second message to the second node.

5. The method of claim 4, further comprising in response to receiving the first message from the second node, determining, by the key management node, that the first node is authorized to send the second message to the second node or that the second node is authorized to receive the second message from the first node based on one or more of:

at least one attribute of the first node;

at least one attribute of the second node; or at least one attribute of the first message component or the first encrypted message component.

6. The method of claim 1, wherein the second node identifies, based on the first message component, a third node;

in response to identifying the third node, the second node sends the first message to the key management node or to the third node.

7. The method of claim 1, further comprising receiving, by the key management node from one of the second node or a third node, the first message;

determining, by the key management node, the third established CEK of the plurality of established CEKs using the private key of the key management node to obtain a second CEK, a second encrypted message component of the plurality of encrypted message components is a second message component of the plurality of message components encrypted using the second CEK;

establishing, by the key management node, the second CEK using a public key of the third node to obtain a fourth established CEK; and sending, by the key management node, a third message comprising the plurality of encrypted message components, the fourth established CEK, and wherein the third node determines the fourth established CEK to obtain the second CEK and decrypts the second encrypted message component using the second CEK to obtain the second message component.

8. The method of claim 7, wherein the third message further comprises a fifth established CEK, and wherein the fifth established CEK is one of the plurality of established CEKs in the first message.

9. The method of claim 8, wherein the fifth established CEK is in at least one of the first message or the second message.

10. The method of claim 7, wherein the third established CEK is established using the public key of the key management node.

11. The method of claim 7, wherein the key management node receives the first message from the second node;

the key management node sends the third message to the second node; and the second node sends the third message to the third node in response to receiving the third message from the key management node.

12. The method of claim 11, further comprising in response to receiving the first message from the second node, determining, by the key management node, that the second node is authorized to send the third message to the third node or that the third node is authorized to receive the third message from the second node based on one or more of:

at least one attribute of the second node;

at least one attribute of the third node; or at least one attribute of the second message component or the second encrypted message component.

13. The method of claim 7, wherein the third node receives the first message from the second node;

the third node sends the first message to the key management node in response to receiving the first message from the second node; and the key management node sends the third message to the third node.

14. The method of claim 13, further comprising in response to receiving the first message from the third node, determining, by the key management node, that the second node is authorized to send the third message to the third node or that the third node is authorized to receive the third message from the second node based on one or more of:

at least one attribute of the second node;

at least one attribute of the third node; or at least one attribute of the second message component or the second encrypted message component.

15. The method of claim 1, further comprising generating, by the key management node using another private key of the key management node, a cryptographic signature on the second message, wherein the signed second message is sent to the first node or the second node, and the second node verifies the signature using another public key of the key management node in response to receiving the signed second message from the first node or from the key management node, the private key of the key management node is different from the another private key of the key management node, and the public key of the key management node is different from the another public key of the key management node.

16. The method of claim 1, further comprising signcrypting, by the key management node, the second message, wherein the signcrypted second message is sent to the first node or the second node, and the second node verifies and decrypts the signcrypted second message in response to receiving the signed second message from the first node or from the key management node.

17. A system, comprising at least one processor configured to:

receive from one of a first node or a second node, a first message comprising a plurality of encrypted message components and a plurality of established Content Encryption Keys (CEKs), wherein each of the plurality of encrypted message components of the first message is one of a plurality of message components encrypted using a respective one of a plurality of CEKs, and wherein each of the plurality of established CEKs is one of the plurality of CEKs encrypted using a public key of a key management node;

determining a first established CEK of the plurality of established CEKs using a private key of the key management node to obtain a first CEK, wherein the private key and the public key of the key management node form a public and private key pair, a first encrypted message component of the plurality of encrypted message components is a first message component of the plurality of message components encrypted using the first CEK;

encrypt the first CEK using a public key of the second node to obtain a second established CEK;

send a second message comprising the plurality of encrypted message components, the second established CEK, and a third established CEK, wherein the third established CEK is one of the plurality of established CEKs in the first message, and wherein the second node decrypts the second established CEK to obtain the first CEK and decrypts the first encrypted message component using the first CEK to obtain the first message component;

determine a Time Stamp Token (TST) for the second message, the TST comprises a cryptographic signature generated over a content comprising a hash of the second message and a timestamp, wherein the digital signature is signed using another private key of the key management node; and send, to the first node or the second node, the TST along with the second message, wherein the second node verifies the cryptographic signature using another public key of the key management node in response to receiving the TST from the first node or from the key management node, the private key of the key management node is different from the another private key of the key management node, and the public key of the key management node is different from the another public key of the key management node.

18. The system of claim 17, wherein the at least one processor is further configured to:

receive from one of the second node or a third node, the first message;

determine the third established CEK of the plurality of established CEKs using the private key of the key management node to obtain a second CEK, a second encrypted message component of the plurality of encrypted message components is a second message component of the plurality of message components encrypted using the second CEK;

establish the second CEK using a public key of the third node to obtain a fourth established CEK; and send a third message comprising the plurality of encrypted message components, the fourth established CEK, and wherein the third node determines the fourth established CEK to obtain the second CEK and decrypts the second encrypted message component using the second CEK to obtain the second message component.

19. A non-transitory processor-readable media comprising processor-readable instructions, such that, when executed, causes at least one processor to:

receive from one of a first node or a second node, a first message comprising a plurality of encrypted message components and a plurality of encrypted Content Encryption Keys (CEKs), wherein each of the plurality of encrypted message components of the first message is one of a plurality of message components encrypted using a respective one of a plurality of CEKs, and wherein each of the plurality of established CEKs is one of the plurality of CEKs established using a public key of a key management node;

determine a first established CEK of the plurality of established CEKs using a private key of the key management node to obtain a first CEK, wherein the private key and the public key of the key management node form a public and private key pair, a first encrypted message component of the plurality of encrypted message components is a first message component of the plurality of message components encrypted using the first CEK;

establish the first CEK using a public key of the second node to obtain a second established CEK; and send a second message comprising the plurality of encrypted message components, the second established CEK, and a third established CEK, wherein the third established CEK is one of the plurality of established CEKs in the first message, and wherein the second node determines the second established CEK to obtain the first CEK and decrypts the first encrypted message component using the first CEK to obtain the first message component;

determine a Time Stamp Token (TST) for the second message, the TST comprises a cryptographic signature generated over a content comprising a hash of the second message and a timestamp, wherein the digital signature is signed using another private key of the key management node; and send, to the first node or the second node, the TST along with the second message, wherein the second node verifies the cryptographic signature using another public key of the key management node in response to receiving the TST from the first node or from the key management node, the private key of the key management node is different from the another private key of the key management node, and the public key of the key management node is different from the another public key of the key management node.

* * * * *